US010448066B2

(12) United States Patent
Puttagunta et al.

(10) Patent No.: US 10,448,066 B2
(45) Date of Patent: Oct. 15, 2019

(54) RETRIEVING MEDIA CONTENT (71) Applicant: BLACKBERRY LIMITED, Waterloo (CA)

(72) Inventors: Krishna Prasad Puttagunta, Irving, TX (US); John Nitish, Sunnyvale, CA (US); Raghuveer Boinapalli, Irving, TX (US); Venkat Krishna Mohan Dasyam, Irving, TX (US); Jorge Alberto Parada Serrano, Irving, TX (US); Kiran Kumar Sripada, Irving, TX (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 15/513,714

(22) PCT Filed: Sep. 23, 2015

(86) PCT No.: PCT/US2015/051770
§ 371 (c)(1),
(2) Date: Mar. 23, 2017

(87) PCT Pub. No.: WO2016/049219
PCT Pub. Date: Mar. 31, 2016

(65) Prior Publication Data
US 2017/0302976 A1  Oct. 19, 2017

Related U.S. Application Data (60) Provisional application No. 62/055,116, filed on Sep. 25, 2014.

(51) Int. Cl.
*H04N 7/16*         (2011.01)
*H04N 21/2347*     (2011.01)
(Continued)

(52) U.S. Cl.
CPC ..... *H04N 21/23476* (2013.01); *G06F 16/957* (2019.01); *G06F 21/6209* (2013.01);
(Continued)

(58) Field of Classification Search
CPC ......... H04N 21/41407; H04N 21/4126; H04N 21/4316; H04N 21/4408; H04N 21/44236;
(Continued)

(56) References Cited

U.S. PATENT DOCUMENTS 7,343,419 B1 * 3/2008 Robinson .......... G06F 17/30017
348/E5.006
8,839,292 B1 * 9/2014 Miloseski .......... H04N 21/4126
725/110

(Continued)

OTHER PUBLICATIONS

International Search Report and Written Opinion of the International Searching Authority issued in International Application No. PCT/US2015/051770 dated Dec. 4, 2015; 11 pages.
(Continued)

*Primary Examiner* — Pankaj Kumar
*Assistant Examiner* — Timothy R Newlin
(74) *Attorney, Agent, or Firm* — Fish & Richardson P.C.

(57) ABSTRACT

A method and system for retrieving media data. The method comprises: receiving webpage data at an application running on a computing device; rendering a webpage based on the webpage data using a rendering engine native to the computing device; identifying a media element in the webpage, wherein the media element includes data identifying media data stored at a media server which is remote from the computing device; and replacing the media element in the webpage with a dummy element comprising code which, when executed, invokes a media handler provided by the application; retrieving, by the media handler, the media data
(Continued)

from the media server; and providing the media data to a first media player component for playback.

20 Claims, 5 Drawing Sheets

(51) Int. Cl.
  *G06F 16/957* (2019.01)
  *H04L 29/06* (2006.01)
  *H04L 29/08* (2006.01)
  *G06F 21/62* (2013.01)
  *H04N 21/61* (2011.01)

(52) U.S. Cl.
  CPC ...... *H04L 63/0272* (2013.01); *H04L 63/0428* (2013.01); *H04L 65/1063* (2013.01); *H04L 67/02* (2013.01); *H04L 67/28* (2013.01); *H04N 21/6125* (2013.01)

(58) Field of Classification Search
  CPC ........... H04N 21/4438; H04N 21/4627; H04N 21/472; H04N 21/482
  See application file for complete search history.

(56) References Cited

U.S. PATENT DOCUMENTS

| | | | |
|---|---|---|---|
| 2002/0027562 A1 | 3/2002 | Kimble et al. | |
| 2002/0146237 A1* | 10/2002 | Safadi | H04N 5/765 386/259 |
| 2005/0078944 A1* | 4/2005 | Risan | G06F 21/10 386/213 |
| 2005/0177866 A1 | 8/2005 | Kirsch | |
| 2005/0204163 A1* | 9/2005 | Alkove | G06F 21/10 726/5 |
| 2007/0230828 A1* | 10/2007 | Ignatchenko | G06T 3/40 382/298 |
| 2008/0092182 A1* | 4/2008 | Conant | H04N 7/17318 725/109 |
| 2010/0281042 A1* | 11/2010 | Windes | H04N 7/17327 707/756 |
| 2011/0035685 A1* | 2/2011 | Johanson | H04N 7/15 715/753 |
| 2011/0085059 A1* | 4/2011 | Noh | G11B 27/034 348/231.99 |
| 2011/0246567 A1* | 10/2011 | Cedervall | H04N 21/4431 709/203 |
| 2011/0307785 A1* | 12/2011 | Demarta | G06F 9/44526 715/719 |
| 2012/0060100 A1 | 3/2012 | Sherwood et al. | |
| 2012/0117590 A1* | 5/2012 | Agnihotri | H04N 21/25816 725/30 |
| 2012/0209964 A1* | 8/2012 | Harrison | H04N 21/234309 709/219 |
| 2012/0331498 A1 | 12/2012 | Houston | |
| 2013/0007576 A1* | 1/2013 | Lund | H04N 21/4307 715/203 |
| 2013/0074131 A1 | 3/2013 | Cerveau et al. | |
| 2014/0143806 A1* | 5/2014 | Steinberg | H04N 21/23424 725/34 |
| 2014/0208352 A1* | 7/2014 | Singh | H04L 65/605 725/38 |
| 2015/0066913 A1* | 3/2015 | Funk | G06F 16/48 707/722 |
| 2015/0086178 A1* | 3/2015 | Ray | G11B 27/105 386/241 |
| 2015/0324832 A1* | 11/2015 | Kaufman | G06F 3/0482 705/14.17 |
| 2015/0332321 A1* | 11/2015 | Raichelgauz | G06Q 30/0255 705/14.53 |
| 2017/0070789 A1* | 3/2017 | Liassides | H04N 21/812 |

OTHER PUBLICATIONS

European Communication under Rule 71(3) EPC issued in European Application No. 15779088.2 dated Dec. 18, 2018, 33 pages.

* cited by examiner

RETRIEVING MEDIA CONTENT

CROSS-REFERENCE TO RELATED APPLICATIONS

This application is a U.S. National Stage of PCT/US2015/051770 filed on Sep. 23, 2015, which claims the benefit of U.S. Provisional Application No. 62/055,116, filed Sep. 25, 2014, the contents of which are hereby incorporated in their entirety.

BACKGROUND OF THE INVENTION

Field of the Invention

The present invention relates to a method and apparatus for secure retrieval of media content over a network.

Description of the Related Technology

Secure platforms provide an architecture for deployment and management of secure applications running on computing devices. A secure application enables an enterprise to deploy sensitive data to the respective computing device, and to remotely manage the sensitive data in a secure manner. For example, such management may include remote deletion of the sensitive data in the event that the computing device is compromised or in the event that the user of the computing device leaves the employment of the enterprise.

An example of a secure application is a secure web browser which is configured to retrieve, render, and store web content in accordance with a policy set by the enterprise. A secure web browser may also provide secure access to web and media content hosted in an enterprise intranet. In this context, the secure web browser may provide encryption of data "in transit" between the enterprise intranet and data "at rest" on the computing device. For example, a secure browser application may employ "containerization", according to which the data is encrypted and "wrapped" in a container to which various access policies can be applied in order to control which users can access the data within the container. The access policies can, for example, be determined and varied if desired by a remote user, such as an administrator.

Typically, a secure application running on a computing device interfaces with one or more native frameworks provided by the underlying operating system running on the computing device. For example, the iOS™ operating system developed by APPLE®, of Cupertino, Calif., United States of America, provides various frameworks for rendering of web content and playback of audio and/or video media, which may be utilized by a secure web browser for retrieval and rendering of web and media content.

An example of a secure platform for the development and deployment of secure applications is the GOOD DYNAMICS™ mobile platform developed by GOOD TECHNOLOGY™ of Sunnyvale, Calif., United States of America.

SUMMARY

A first aspect provides a method of retrieving media data, the method comprising: receiving webpage data at an application running on a computing device; rendering a webpage based on the webpage data using a rendering engine native to the computing device; identifying a media element in the webpage, wherein the media element includes data identifying media data stored at a media server which is remote from the computing device; and replacing the media element in the webpage with a dummy element comprising code which, when executed, invokes a media handler provided by the application; retrieving, by the media handler, the media data from the media server; and providing the media data to a first media player component for playback. According to this method, the application running on the computing device is able to circumvent a default behavior of the rendering engine for processing media elements, such that the associated media data can be processed by a media handler provided by the application. Moreover, providing a media handler to retrieve the media data enables the application to control how the media data is retrieved, such as by using a secure communication channel between the application and a private network.

According to some embodiments, the dummy element is configured to suppress retrieval of the media data by a second media player component associated with the rendering engine, wherein the second media player is different from the first media player.

According to some embodiments, the first media player is provided by the iOS™ AVFoundation framework and the second media player is provided by the iOS™ MediaPlayer framework.

According to some embodiments, identifying the media element comprises running a script configured to parse the webpage to identify a tag associated with the media element.

According to some embodiments, the method further comprises: retrieving the media data from the media server to the application; encrypting at least part of the media data to produce encrypted media data; and storing in the encrypted media data in an area of non-volatile storage associated with the application. According to these embodiments, the application can ensure that the media data is stored securely and subject to access policies associated with the application.

According to some embodiments, identifying the media element is performed in response to rendering the webpage.

According to some embodiments, identifying the media element is performed at a predetermined time after rendering of the webpage has been completed. According to these embodiments, the delay between rendering of the webpage and identification of the media element is provided to account for media elements which are dynamically inserted into the webpage after it has initially been rendered by the rendering engine.

According to some embodiments, the media element is a HyperText Markup Language video element or a HyperText Markup Language audio element.

According to some embodiments, the media handler is configured to retrieve the media data through a secure communication channel established between the application and a proxy server which is remote from the computing device. According to these embodiments, the media data can be retrieved securely to prevent tampering or eavesdropping by a malicious third party.

According to some embodiments, the media server is located in a private network, and the proxy server manages access to the private network.

According to some embodiments, the method further comprises establishing the secure communication channel between the application and the proxy server.

A second aspect provides a method of retrieving media data, the method comprising: receiving webpage data at an application running on a computing device; identifying a media element in the webpage data, wherein the media element includes data identifying media data stored at a content server which is remote from the computing device; replacing the media element in the webpage with a dummy element, wherein the dummy element comprises code which, when executed, invokes a media handler provided by the application; and wherein the media handler is configured to retrieve the media data from the content server via a secure communication channel, the secure connection channel having been configured by the application.

A third aspect provides a system for retrieving media data, the system comprising at least one memory including computer program code; and at least one processor in data communication with the at least one memory, wherein the at least one processor is configured to: receive webpage data at an application running on a computing device; render a webpage based on the webpage data using a rendering engine native to the computing device; identify a media element in the webpage, wherein the media element includes data identifying media data stored at a media server which is remote from the computing device; and replace the media element in the webpage with a dummy element comprising code which, when executed, invokes a media handler provided by the application; retrieve, by the media handler, the media data from the media server; and provide the media data to a first media player component for playback.

A fourth aspect provides a non-transitory computer-readable storage medium comprising computer-executable instructions which, when executed by a processor, cause a computing device to perform a method of retrieving media data, the method comprising: receiving webpage data at an application running on a computing device; rendering a webpage based on the webpage data using a rendering engine native to the computing device; identifying a media element in the webpage, wherein the media element includes data identifying media data stored at a media server which is remote from the computing device; and replacing the media element in the webpage with a dummy element comprising code which, when executed, invokes a media handler provided by the application; retrieving, by the media handler, the media data from the media server; and providing the media data to a first media player component for playback.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
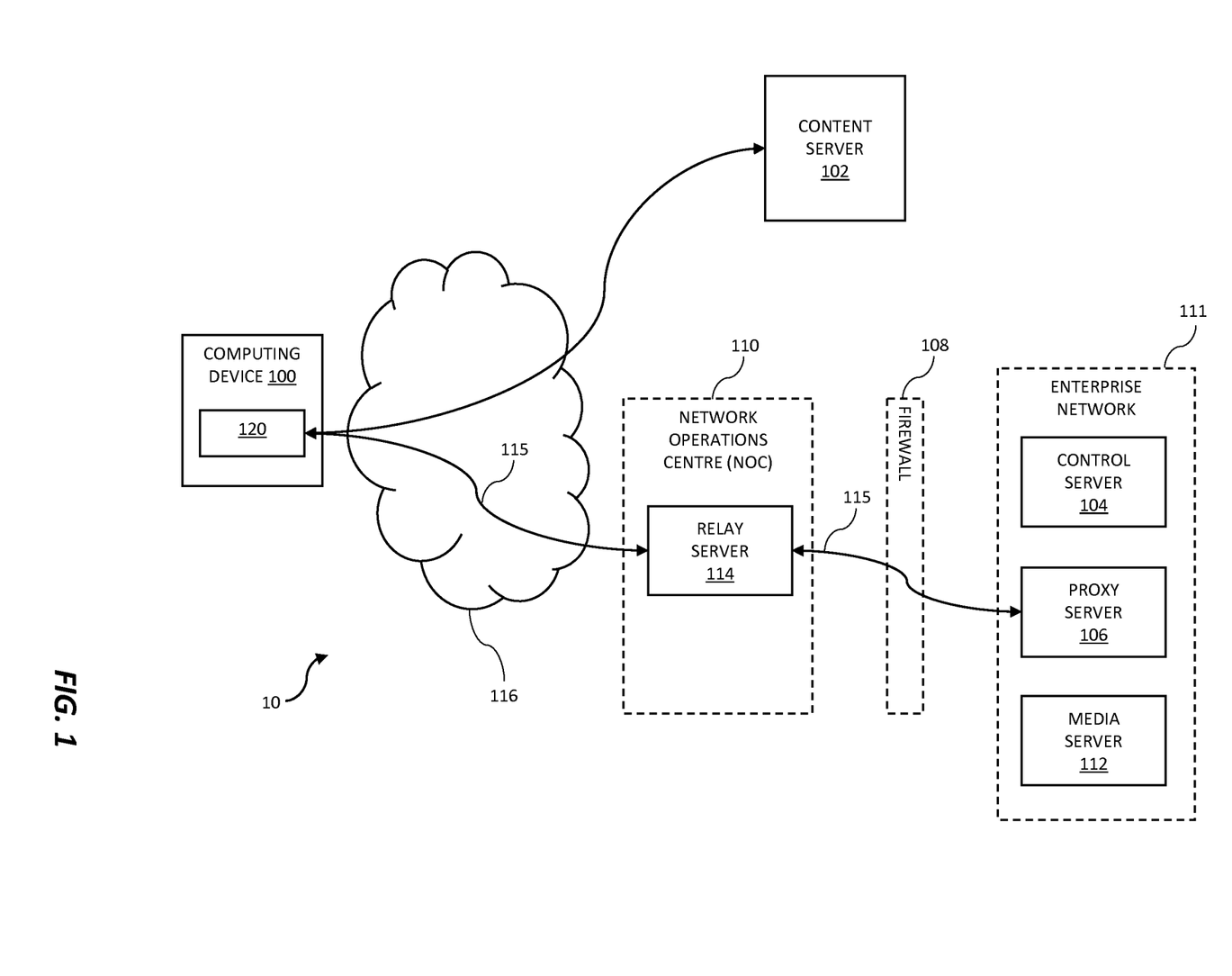
FIG. 1 is a schematic drawing showing a system for retrieving media data in accordance with an embodiment.

An example of a system 10 for retrieving media data associated with a webpage according to an embodiment is shown schematically in FIG. 1. The system includes a computing device 100 which is connected to a communications network 116. The computing device 100 includes a secure application 120 which is configured to retrieve and render web content via the communications network 116. For example, the secure application 120 may access a content server 102 via the communications network 116 to retrieve and render webpage data. The secure application 120 is also configured to access web and media content hosted by one or more servers in an enterprise network or intranet 111. The enterprise network 111 is a private network or intranet, and includes a plurality of enterprise servers, such as a control server 104, a proxy server 106, and a media server 112.

The control server 104 provides functionality for provisioning and management of the secure application 120 running on the computing device 100. Typically, the control server 104 is configured to authenticate the user of the computing device 100 prior to provisioning the secure application 120. The control server 104 may also be configured to provide remote management of the secure application 120, such as remote locking or remote deletion of data stored by the secure application 120 in the event that the associated computing device 100 has been compromised in some way (e.g. stolen).

The proxy server 106 provides the secure application 120 with secure and authenticated access to enterprise servers on the enterprise network 111, such as the media server 112. To access the media server 112, the secure application 120 establishes a secure communication channel with the proxy server 106, which in turn only allows the secure application 120 to access the media server 112 if, for example, permission to do so has been granted by an administrator of the enterprise network 111. Typically, access permissions for resources in the enterprise network 111 are managed by the control server 104 and enforced by the proxy server 106.

The media server 112 hosts enterprise media data, such as video and/or audio data. The media server 112 may be a web server, such as an APACHE™ webserver or Internet Information Services from MICROSOFT™ of Redmond, Wash., United States of America. The media data may include one or more corporate videos including sensitive or confidential information. In this case, it desirable to ensure that access to and dissemination of the media data is controlled by the enterprise in accordance with one or more policies. For example, the media data may specify a particular group of employees of the enterprise allowed to view the media data on their computing devices when outside the enterprise network. As discussed above, access to media data hosted by the media server 112 from the secure application 120 is controlled by the proxy server 106 in accordance settings maintained by the control server 104 and configured by an administrator.

In the present embodiment, access to the enterprise network 111 is monitored and controlled by a Network Operations Centre (NOC) 110 which cooperates with a firewall 108 to restrict access to the enterprise network 111. In the present embodiment, the NOC 111 comprises a relay server 114 which facilitates establishment of secure and authenticated communication channel 115 between the secure application 120 and the proxy server 106 over the communications network 116. The secure communications channel between the secure application 120 and the proxy server 106 may be used to access the media data provided by the media server 112 as discussed above. Authentication of the computing device 100 and/or the respective secure application 120 is typically performed using a Public Key Infrastructure or any other appropriate authentication technique known in the art.

The secure application 120 is configured to securely retrieve, render and manage web content in accordance with one or more policies configured by the control server 104 and "pushed" to the secure application 120. For example, the secure application 120 may be configured to access web content hosted publically on a content server 102 (i.e. publically available via the communications network 116) and web content hosted privately on the media server 112 in the enterprise network 111 (i.e. only accessible to authorized applications via the secure and authenticated communication channel 115). In some cases, web content hosted by the content server 102 may reference one or more media objects hosted by the media server 112 which must be retrieved over the secure connection 115 between the secure application 120 and the proxy server 106. To address this requirement, the secure application 120 is configured to ensure that embedded references to media objects provided by the media server 112 are identified and retrieved securely using the secure and authenticated communication channel 115.

Figure 2:
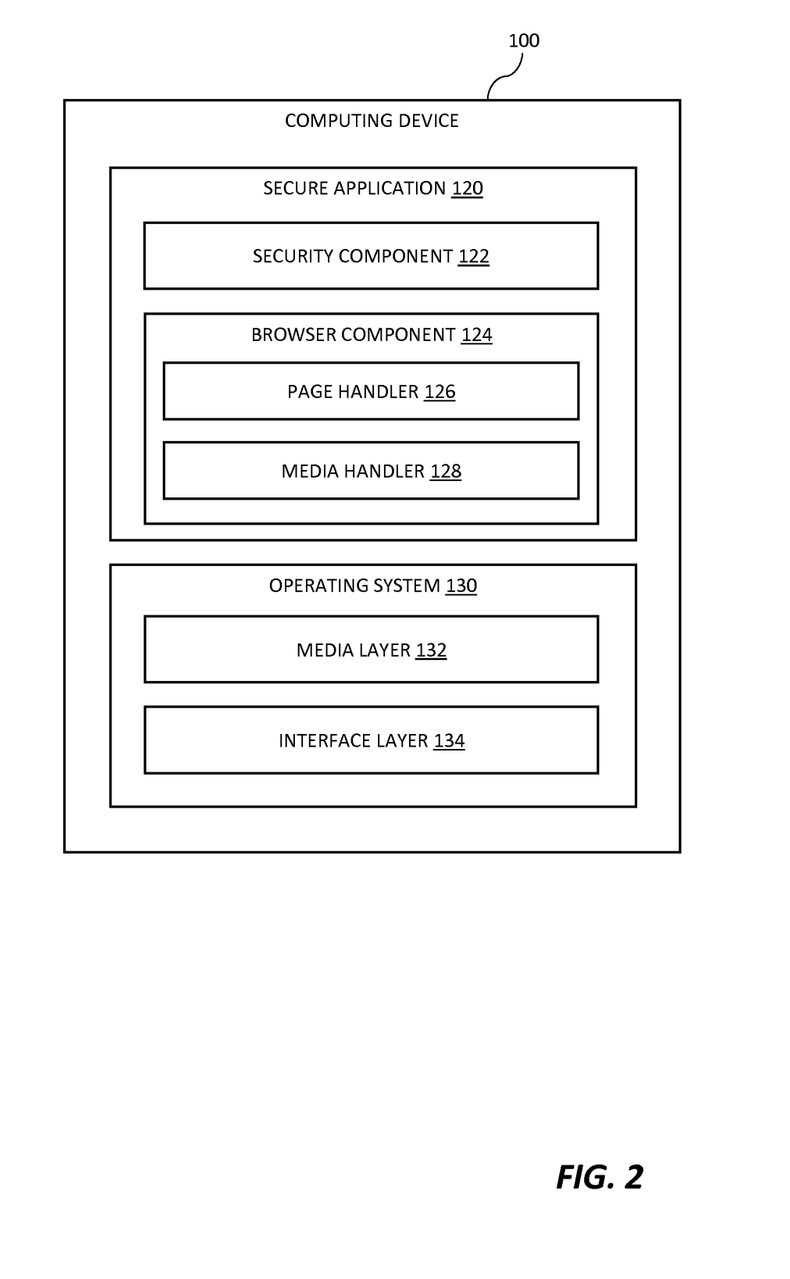
FIG. 2 is a schematic drawing showing a computing device for retrieving media data in accordance with an embodiment.

With reference to FIG. 2, the computing device 100 comprises an operating system 130 which provides applications running on the computing device 100 with access to common functionality and resources. The operating system 130 includes a media layer 132 and an interface layer 134. The media layer 132 provides media playback functionality to applications running on the computing device 100, including secure application 120. In particular, the media layer 132 provides one or more classes which enable applications running on the computing device to create and manage media player objects for playback of video and/or audio data. In a similar manner, the interface layer 134 provides functionality which enables applications running on the computing device 100 to construct and manage user interfaces via one or more further classes. In the present embodiment, the interface layer 134 includes one or more classes which enable applications to retrieve and embed rendered web content into an application running on the computing device 100.

In one example, the operating system 130 is the iOS™ operating system developed by APPLE®, of Cupertino, Calif., United States of America. In this example, the media layer 132 corresponds to the iOS™ AVFoundation framework which provides several classes for creation and control of AVAsset objects for playback of video and/or audio data. In a similar manner, the interface layer 134 corresponds to the iOS™ UIKit framework which provides several classes for creation and control of user interface objects, including the UIWebView class which enables retrieval and rendering of web content using one or more UIWebView objects. Further details of the AVFoundation framework and the UIKit framework can be found in the iOS™ Developer Library documentation at https://developer.apple.com/library/ios/navigation/, which is incorporated herein by reference.

In the present embodiment, the secure application 120 is configured to interface with the media layer 132 and the interface layer 134 to provide secure retrieval and rendering of web and media content in accordance with the security policy configured by the control server 104 and pushed or downloaded to the secure application 120. To facilitate this functionality, the secure application 120 includes a security component 122 and a browser component 124 which interface with the media layer 132 and the interface layer 134. The security component 122 is configured to establish and manage a secure communication channel between the application 120 and the proxy server 106 of FIG. 1. For example, the security component 122 may be configured to establish and manage a secure tunnel using an application-level virtual private network (VPN) or a proprietary protocol such at the Good Relay Protocol developed by GOOD TECHNOLOGY™ of Sunnyvale, Calif., United States of America. In the latter example, the secure tunnel corresponds to the secure and authenticated communications channel 115 of FIG. 1, and is established in cooperation with the relay server 114. Typically, the security component 122 is also configured to manage secure storage of web and media data in a non-volatile memory (not shown) of the computing device 100. For example, the security component 122 may provide containerization of data persisted in a non-volatile memory of the computing device 100 using encryption techniques based on the Advanced Encryption Standard (AES), established by the United States National Institute of Standards and Technology.

The browser component 124 of the secure application 120 is configured to manage retrieval and rendering of web content retrieved from one or more remote servers, such as the content server 102 and the media server 111 of FIG. 1, using functionality provided by the interface layer 134. For example, where the operating system 130 is the iOS™ operating system, the browser component 124 may retrieve and render web content by creating one or more UIWebView objects using the iOS™ UIKit framework. As discussed above, the web content rendered by the secure application 120 may include one or more embedded references to media objects, such as video and/or audio files. Typically, the interface layer 134 includes functionality for retrieval and playback of referenced media objects but this functionality is often limited in comparison with the functionality provided natively by the media layer 132. This disparity in functionality is exemplified by the iOS™ UIWebView class which only allows playback of media objects using the iOS™ MediaPlayer framework, which is significantly more limited that the iOS™ AVFoundation framework in terms of configurability. A particular drawback associated with video playback by a UIWebView object is that an application developer is limited in terms of configuration options for retrieval and rendering of referenced video and/or audio objects. For example, an iOS™ UIWebView object will default to the iOS™ MediaPlayer framework for playback of video and audio content referenced in a webpage using as HTML5 <video> and <audio> elements. This default behavior does not allow for retrieval of media objects via, for example, the secure tunnel 115 established between the secure application 120 and the proxy server 106 of FIG. 1, and thus prevents the secure application 120 from retrieving media objects hosted by the media server 112.

In order to address the drawbacks discussed above, the browser component 124 includes a page handler 126 and a media handler 128 which are configured to process web content retrieved and rendered by the interface layer 134, such that referenced media objects can be retrieved over the secure tunnel 115 established between the secure application 120 and the proxy server 106 of FIG. 1. In other words, the page handler 126 and the media handler 128 cooperate to override or suppress the default video playback behavior associated with the interface layer 134. With particular reference to the iOS™ example mentioned above, the page handler 126 and the media handler 128 cooperate to prevent a UIWebView object from retrieving and playing referenced media objects using the iOS™ MediaPlayer framework, and instead handle retrieval of media content internally within the secure application 120. To achieve this circumvention, the page handler 126 is configured to parse web content rendered by the interface layer 134 to identify media elements, such as the HTML5 <video> and <audio> elements which reference video and audio media objects respectively. Typically, a media elements references a respective media object by means of an encapsulated Uniform Resource Locator (URL) which identifies the location where the corresponding media object is hosted. For example, an HTML5 video element may be defined as <video>ORIGINAL_URL</video> tag pair, where the ORIGINAL_URL is indicates the location the associated video data is hosted or stored. With reference to the iOS™ operating system, the page handler 126 may be set as delegate to the webViewDidFinishLoad method of the UIWebView object such that the page handler 126 is trigged to process the webpage once it has been retrieved and rendered by the UIWebView object.

Once the page handler 126 has identified a media element, it replaces the media element with a "dummy element" which is generated in part on the basis of the original URL contained in the media element. The dummy element includes code which, when executed (e.g. tapped or clicked by the user), invokes the media handler 128, which in turn retrieves the referenced media object. For example, where the ORIGINAL_URL references a media object hosted by the media server 112 in the enterprise network 111, the media handler 128 retrieves media data associated with the media object from the media server 112 over the secure tunnel 115, and provides the media data to the media layer 132 for playback within the secure application 120.

In some embodiments, upon receipt of the ORIGINAL_URL, the media handler 128 is configured to instantiate a media handler object to retrieve the media data using the secure tunnel 115, and provide the video content to the media layer 132 for playback within the secure application 120. Again, with reference to the iOS™ example described above, this behavior may be implemented by generating a CUSTOM_URL based on the ORIGINAL_URL and creating an AVAsset for playback of the CUSTOM_URL. The media handler 128 sets the media handler object as delegate to the AVAssetResourceLoader method of the AVAsset object, which ensures that the AVAsset object will delegate retrieval of the CUSTOM_URL to the media handler object during playback. In this example, the CUSTOM_URL is configured to force the AVAsset object to delegate retrieval of the media object through the delegation of the AVAssetResourceLoader method to the media handler object. For example, the customer URL may be configured as a URL which is not understood (i.e. cannot be processed) by the AVAsset object, thereby forcing the AVAsset object to delegate retrieval for the URL to the media handler object. An example of a URL suitable for this process is securemedia:// secureaccess.

In some embodiments, the dummy element may be defined as an HTML <div> element with the onclick property specified to call back to the media handler 128 using a JavaScript function. In this example, JavaScript function may pass the ORIGINAL_URL to the media handler 128 as a parameter when the <div> element is clicked or tapped by the user. In further embodiments, the <div> element may configured with a placeholder image or text which, when rendered, informs the user that the media object will be retrieved securely for playback. Where the original media element includes a poster image, the dimensions of the placeholder image may be configured to match the dimensions of the poster image, thus ensuring that the layout of the rendered webpage is unaffected by the dummy element.

In some embodiments, the media handler 128 or the media handler object is configured to store or cache media data retrieved from the media server 112 in an encrypted format. For example, the media data may be stored in a secure container associated with the secure application 120. Secure storage of the media data in this manner, ensures that the control server 104 can delete or obfuscate the media data in the event that the computing device 100 is compromised (e.g. stolen) or the user of the computing device 100 leaves the employment of the enterprise.

Figure 3:
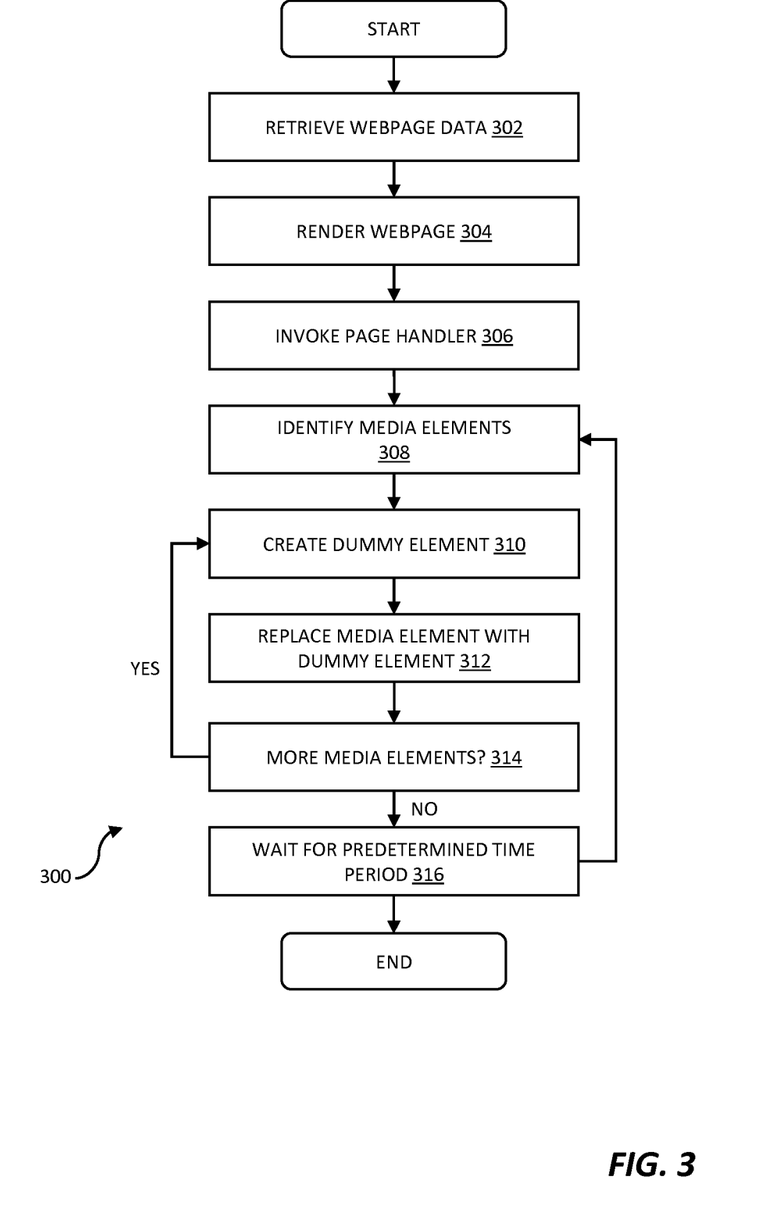
FIG. 3 is a flow chart showing a method of processing a webpage in accordance with an embodiment.

A method 300 performed by the secure application 120 for processing a webpage in accordance with an embodiment is shown in FIG. 3. In this example, as in the description above, the operating system 130 corresponds to the iOS™ operating system and the secure application 120 interfaces with the iOS™ AVFoundation and UIKit frameworks. In a first step, the browser component 124 of the secure application 120 instantiates or creates a UIWebView object which retrieves webpage data from the content server 102 [step 302]. As discussed above, the webpage data typically takes the form of an HTML5 document which is requested using the HTTP protocol. Once the webpage data has been retrieved, the UIWebView object renders a webpage based on the webpage object and the computing device 100 displays the rendered webpage to the user [step 304]. Responsive to rendering the webpage, the browser component 124 invokes the page handler component 126 [step 306] and the page handler 126 scans the rendered webpage to identify a media element [step 308]. As discussed above, the media elements are, in this example, HTML5 <video> and/or <audio> elements which reference media objects hosted by the media server 112 in the enterprise network 111. In order to suppress processing of the identified media elements by the default or native media player associated with the UIWebView object created at step 302, the page handler 126 creates a dummy element to replace the media element identified at step 308 [step 310]. As discussed above, the dummy element contains code which, when executed, invokes the media handler 128 of the browser component 124. Typically, the dummy element is a <div> element which is configured to execute a function to call to the media handler 128 when the user clicks or taps the rendered dummy element. As also discussed above, the dummy element may also be configured with a placeholder image to indicate to the user that the media referenced by the original media element will be retrieved and played back securely by the secure application 120. Next, the page handler 126 replaces the identified media tag with the newly created dummy tag [step 312] and determines whether there are further media elements in the rendered webpage which required replacement [step 314]. If further unprocessed media elements are present in the rendered webpage, the method returns to step 310 to continue processing; however, if no further unprocessed media elements are present, the browser component 124 waits a predetermined time period (e.g. 30 seconds) [step 316] before returning to step 308 to determine whether new media elements have been dynamically added or inserted into the rendered webpage since it was rendered at step 304.

Figure 4:
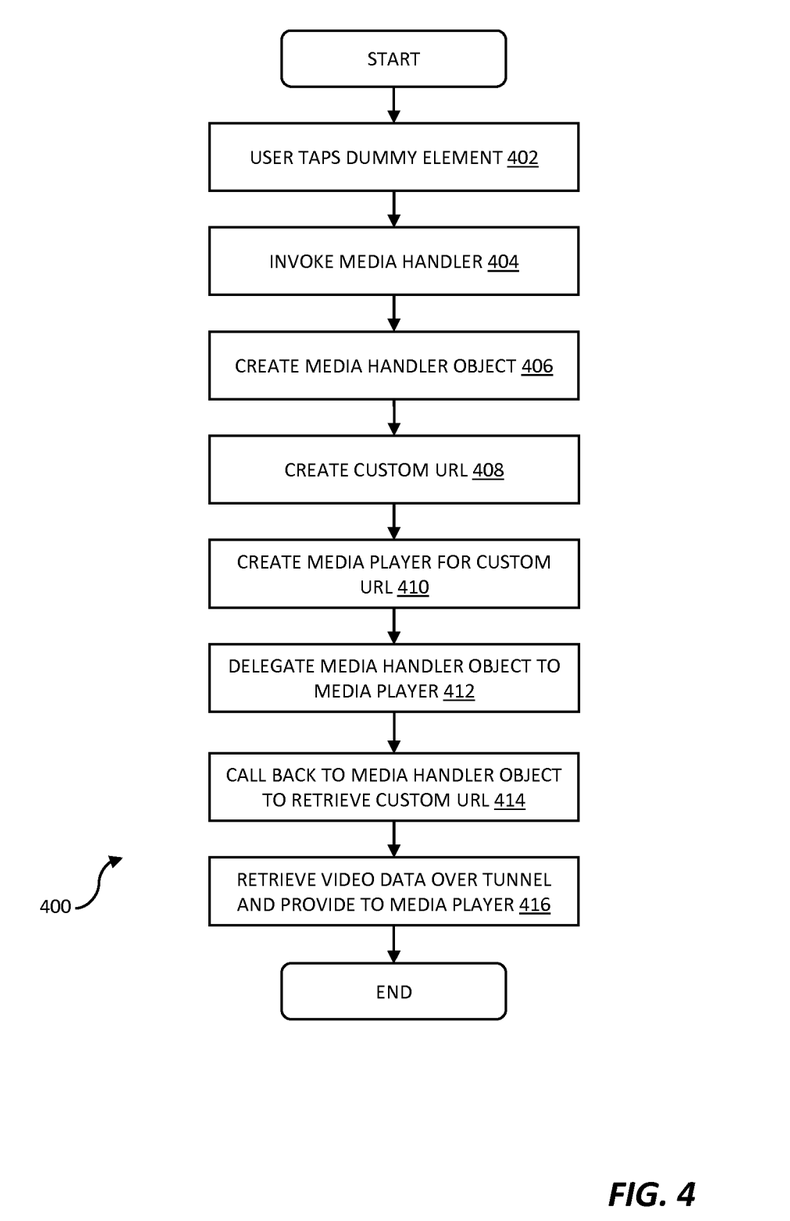
FIG. 4 is a flow chart showing a method of retrieving video data in accordance with an embodiment.

A method 400 performed by the secure application 120 for retrieving media objects in accordance with an embodiment is show in FIG. 4. The method is initiated in response to the secure application 120 detecting that the user has clicked or tapped a dummy element inserted into the rendered webpage by method 300 of FIG. 3 [step 402]. Upon detecting the user click or tap, the browser component 124 executes the code contained by the dummy element which invokes the media handler 128 and passes the ORIGINAL_URL as a parameter to the media handler 128 [step 404]. Next, the media handler 128 creates a media handler object for retrieval for the media data associated with the ORIGINAL_URL [step 406]. Following this, the media handler 128 generates a CUSTOM_URL [step 408] and creates a media player object for the CUSTOM_URL using the media layer 132 provided by the operating system 130 [step 410]. With particular reference to iOS™, step 410 corresponds to creation of an AVAsset object as discussed above with reference to FIG. 2. Next, the media player object created at step 410 is configured to delegate retrieval of the CUSTOM_URL to the media handler object created at step 406 [step 412]. Again, with reference to iOS™, step 412 corresponds to delegation of the AVAssetResourceLoader method of the AVAsset object created at step 410 to the media handler object, such that the AVAsset object calls back to the media handler object when attempting to retrieve the CUSTOM_URL object. Next, when the media player object created at step 410 attempts to retrieve the CUSTOM_URL, it calls back to the media handler object created at step 406 [step 414] which, in turn, retrieves the media data associated with ORIGINAL_URL via the secure tunnel 115 between the secure application 120 and the proxy server 106 and provides the media data to the media player [step 416]. Again referring to the iOS™ example, step 414 corresponds to a call back from the AVAsset to the media handler object for retrieval of the of the CUSTOM_URL, which in turn retrieves the media data associated with the ORIGINAL_URL and provides the media data to the AVAsset object for playback in the secure application 120.

Figure 5:
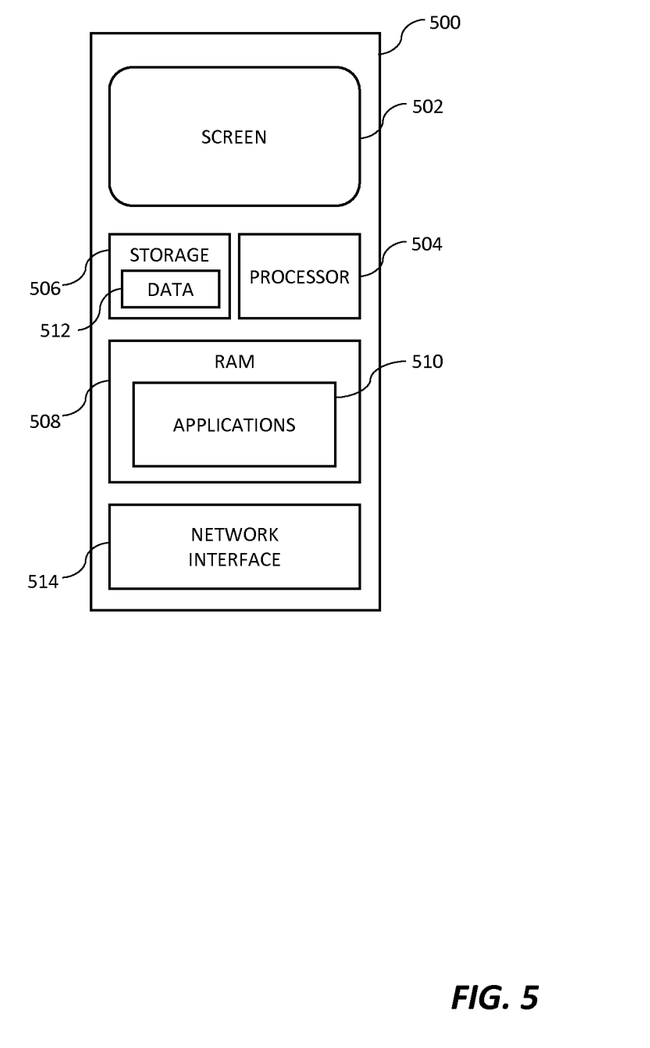
FIG. 5 is a schematic drawing showing a computing device for retrieving media data in accordance with an embodiment.

Typically, the computing device 100 takes the form of a portable computing device such as a mobile telephone. An example of a portable computing device 500 according to an embodiment is shown schematically in FIG. 5. The portable computing device 500 may, for example, take the form of a cellular phone, a smart phone, a personal digital assistance (PDA), a tablet computer, a wearable computing device, a notebook computer, or the like. The portable computing device 500 includes a screen 502, which may be a touch screen for receipt of input from a user. Alternatively or additionally, the portable computing device 500 may include a physical keyboard (not shown), which may be integral to the portable computing device 500 or connected wirelessly or by wired connection to the portable computing device 500. The computing device further includes a processor 504, a non-volatile storage component 506 (such as a hard disk drive or a solid-state drive) and a volatile storage component in the form of random access memory (RAM) 508. The processor executes instructions stored in the random access memory 508 that have been loaded from the non-volatile storage device 506. These instructions are in the form of one or more programs that implement an operating system (not shown) and a secure application 510, such as secure application 120 described above with reference to FIGS. 1 to 4. The random access memory 508 is also used by programs running on the processor 504 as a means of storing and accessing data in the form of electronic signals where the data is used during the execution of the programs. The operating system provides a file system for storing, modifying and accessing data 512 including files held in the non-volatile storage device 506. The file system may be accessible to other programs running on the processor 504 via the operating system. Programs running on the processor 504 also process user input obtained via the screen 502 or keyboard (not shown), etc. The portable computing device 500 also includes a network interface 514 (or a plurality of network interfaces) which allows programs running on the processor 504 to transmit and receive data to and from other devices and/or servers via a communications, using wired and/or wireless connections. Typically, the network interface 514 is implemented in a combination of software and hardware (e.g. a network interface controller) to provide the necessary network connectivity to the programs running on the processor 504. Examples of network interface 514 include a Wi-Fi™ interface and/or a cellular radio utilizing standards such as Global System for Mobile Communications (GSM), Universal Mobile Telecommunications System (UMTS), Code Division Multiple Access (CDMA), Long Term Evolution (LTE), or the like.

It will be appreciated that at least parts of the methods discussed above with reference to FIGS. 1 to 4 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments of the invention can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

The communications network 116 of FIG. 1 may, for example, be or include the Internet, a Public Land Mobile Network (PLMN) and/or a Public Switched Telephone Network (PSTN). In some embodiments, the computing device 100 connects to the communications network 116 via a private network (not shown), such as a Local Area Network (LAN) and/or a Wireless Local Area Network (WLAN). In alternative embodiments, the computing devices 100 may access the communications network 116 using one or more of a number of radio access technologies (not shown) including GSM, UMTS, CDMA, LTE, or the like.

The above embodiments are to be understood as illustrative examples of the invention and further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of retrieving media data, the method comprising:

receiving, from a content server, webpage data at a user device;

rendering, by an application running on the user device, a webpage based on the webpage data using a rendering engine native to the user device;

in response to the user device rendering the webpage, identifying, by the application on the user device, a media element in the webpage, wherein the media element includes data identifying media data stored at a media server, the media server is located in an enterprise network, the content server is located outside of the enterprise network, and the media server is remote from the user device;

determining, by the application and based on the data included in the media element, that the media data is stored at the media server located in the enterprise network and accessible via a secured communication channel; and in response to determining that the media data is stored at the media server located in the enterprise network and accessible via the secured communication channel:

replacing, by the application on the user device, the media element in the webpage with a dummy element comprising code which, when executed, invokes a media handler provided by the application, wherein the dummy element comprises an Hypertext Markup Language (HTML) Content Division element and the dummy element is configured to suppress retrieval and playing of the media data by a first media player component associated with the rendering engine;

retrieving, by the media handler of the application, the media data from the media server via the secured communication channel; and providing the media data to a second media player component for playback, wherein the second media player component is different from the first media player component.

2. The method of claim 1, wherein the second media player component is provided by an iPhone operating system (iOS) AVFoundation framework and the first media player component is provided by an iOS MediaPlayer framework.

3. The method of claim 1, wherein identifying the media element comprises running a script configured to parse the webpage to identify a tag associated with the media element.

4. The method of claim 1, further comprising:
retrieving the media data from the media server to the application;
encrypting at least part of the media data to produce encrypted media data; and
storing the encrypted media data in an area of non-volatile storage associated with the application.

5. The method of claim 1, wherein identifying the media element is performed in response to rendering the webpage.

6. The method of claim 1, wherein identifying the media element is performed at a predetermined time after rendering of the webpage has been completed.

7. The method of claim 1, wherein the media element is a Hypertext Markup Language video element or a Hypertext Markup Language audio element.

8. The method of claim 1, wherein the media handler is configured to retrieve the media data through the secure communication channel established between the application and a proxy server which is remote from the user device.

9. The method of claim 8, further comprising establishing the secure communication channel between the application and the proxy server.

10. A system for retrieving media data, the system comprising at least one memory including computer program code; and at least one processor in data communication with the at least one memory, wherein the at least one processor is configured to:

receive, from a content server, webpage data at a user device;

render, by an application on the user device, a webpage based on the webpage data using a rendering engine native to the user device;

in response to the user device rendering the webpage, identify, by the application on the user device, a media element in the webpage, wherein the media element includes data identifying media data stored at a media server, the media server is located in an enterprise network, the content server is located outside of the enterprise network, and the media server is remote from the user device;

determine, by the application and based on the data included in the media element, that the media data is stored at the media server located in the enterprise network and accessible via a secured communication channel; and in response to determining that the media data is stored at the media server located in the enterprise network and accessible via the secured communication channel:

replace, by the application on the user device, the media element in the webpage with a dummy element comprising code which, when executed, invokes a media handler provided by the application, wherein the dummy element comprises an Hypertext Markup Language (HTML) Content Division element and the dummy element is configured to suppress retrieval and playing of the media data by a first media player component associated with the rendering engine;

retrieve, by the media handler of the application, the media data from the media server via the secured communication channel; and provide the media data to a second media player component for playback, wherein the second media player component is different from the first media player component.

11. The system of claim 10, wherein the second media player component is provided by an iPhone operating system (iOS) AVFoundation framework and the first media player component is provided by an iOS MediaPlayer framework.

12. The system of claim 10, wherein the at least one processor is configured to run a script configured to parse the webpage to identify a tag associated with the media element.

13. The system of claim 10, wherein the at least one processor is configured to run a script configured to:
retrieve the media data from the media server to the application;
encrypt at least part of the media data to produce encrypted media data; and
store the encrypted media data in an area of non-volatile storage associated with the application.

14. A non-transitory computer-readable medium storing computer instructions, that when executed by one or more hardware processors, cause a computing device to perform operations comprising:

receiving, from a content server, webpage data at a user device;

rendering, by an application running on the user device, a webpage based on the webpage data using a rendering engine native to the user device;

in response to the user device rendering the webpage, identifying, by the application on the user device, a media element in the webpage, wherein the media element includes data identifying media data stored at a media server, the media server is located in an enterprise network, the content server is located outside of the enterprise network, and the media server is remote from the user device;

determining, by the application and based on the data included in the media element, that the media data is stored at the media server located in the enterprise network and accessible via a secured communication channel; and in response to determining that the media data is stored at the media server located in the enterprise network and accessible via the secured communication channel:

replacing, by the application on the user device, the media element in the webpage with a dummy element comprising code which, when executed, invokes a media handler provided by the application, wherein the dummy element comprises an Hypertext Markup Language (HTML) Content Division element and the dummy element is configured to suppress retrieval and playing of the media data by a first media player component associated with the rendering engine;

retrieving, by the media handler of the application, the media data from the media server via the secured communication channel; and     providing the media data to a second media player component for playback, wherein the second media player component is different from the first media player component.

15. The non-transitory computer-readable medium of claim 14, wherein the second media player component is provided by an iPhone operating system (iOS) AVFoundation framework and the first media player component is provided by an iOS MediaPlayer framework.

16. The non-transitory computer-readable medium of claim 14, wherein identifying the media element comprises running a script configured to parse the webpage to identify a tag associated with the media element.

17. The non-transitory computer-readable medium of claim 14, wherein the operations further comprise:

retrieving the media data from the media server to the application;

encrypting at least part of the media data to produce encrypted media data; and     storing the encrypted media data in an area of non-volatile storage associated with the application.

18. The non-transitory computer-readable medium of claim 14, wherein identifying the media element is performed in response to rendering the webpage.

19. The non-transitory computer-readable medium of claim 14, wherein identifying the media element is performed at a predetermined time after rendering of the webpage has been completed.

20. The non-transitory computer-readable medium of claim 14, wherein the media element is a Hypertext Markup Language video element or a Hypertext Markup Language audio element.

* * * * *

UNITED STATES PATENT AND TRADEMARK OFFICE
CERTIFICATE OF CORRECTION

Page 1 of 1

PATENT NO.         : 10,448,066 B2
APPLICATION NO.    : 15/513714
DATED              : October 15, 2019
INVENTOR(S)        : Krishna Prasad Puttagunta et al.

It is certified that error appears in the above-identified patent and that said Letters Patent is hereby corrected as shown below:

On the Title Page

(72) Inventors, please correct inventor's name from "John Nitish" to -- Nitish John --

Signed and Sealed this
Tenth Day of March, 2020

Andrei Iancu
*Director of the United States Patent and Trademark Office*